(12) United States Patent
Lin

(10) Patent No.: US 6,286,843 B1
(45) Date of Patent: Sep. 11, 2001

(54) STEERING MECHANISM OF HANDLE-CONTROLLED SKATE BOARD

(76) Inventor: Su-Yu Lin, 7F, No. 5, Lane 36, Chien Kuo South Road, Chang Hua City (TW)

( * ) Notice: Subject to any disclaimer, the term of this patent is extended or adjusted under 35 U.S.C. 154(b) by 0 days.

(21) Appl. No.: 09/731,015

(22) Filed: Dec. 7, 2000

(30) Foreign Application Priority Data

Sep. 5, 2000 (TW) .............................................. 089215390

(51) Int. Cl.$^7$ .................................................. A63C 17/02
(52) U.S. Cl. .................................. 280/11.28; 280/87.042
(58) Field of Search ........................... 280/87.01, 87.041, 280/87.042, 87.043, 87.05, 14.27, 14.28, 267, 263, 11.28

(56) References Cited

U.S. PATENT DOCUMENTS

| | | | |
|---|---|---|---|
| 2,032,657 | * 3/1936 | Frederickson | ................ 280/87.042 |
| 2,531,933 | * 11/1950 | Clark | ................ 280/87.01 |
| 3,331,612 | * 7/1967 | Tietge | ................ 280/11.28 |
| 4,054,297 | * 10/1977 | Solimine | ................ 280/87.042 |
| 4,120,508 | * 10/1978 | Brown et al. | ................ 280/11.28 |
| 4,775,162 | * 10/1988 | Chao | ................ 280/87.041 |
| 5,263,725 | * 11/1993 | Gesmer et al. | ................ 280/11.28 |
| 5,997,018 | * 12/1999 | Lee | ................ 280/87.042 |

FOREIGN PATENT DOCUMENTS

616723 * 1/1949 (GB) .............................. 280/87.042

* cited by examiner

Primary Examiner—Paul N. Dickson
Assistant Examiner—Bridget Avery
(74) Attorney, Agent, or Firm—Rosenberg, Klein & Lee

(57) ABSTRACT

A steering mechanism of a handle-controlled skate board including comprising a front wheel assemblies including two front wheels controlled by the steering mechanism. The steering mechanism is pivotally connected with the top section of a swinging seat by a fixing seat. A driving arm is fixed on rear side of the fixing seat for driving a base bar. The middle portion of the base bar is pivotally connected with the center of the bottom edge of the swinging seat. Two lateral ends of the base bar transversely extend to outer sides of the swinging seat for mounting wheels thereon.

12 Claims, 8 Drawing Sheets

STEERING MECHANISM OF HANDLE-CONTROLLED SKATE BOARD

BACKGROUND OF THE INVENTION

The present invention is related to a steering mechanism of handle-controlled skate board. When the handle-controlled skate board is laterally tilted, the wheel assembly is horizontally steered in a laterally tilting direction.

FIG. 11 shows an existent handle-controlled skate board 7 including a skate board 71, two wheels 72 respectively mounted at front and rear ends of the skate board 71 and an upright handle 73 mounted on front end of the skate board 71. A user can stand on the skate board 71 to ride the handle-controlled skate board 7. Such handle-controlled skate board 7 has some shortcomings as follows:

First, in order to enable a user to easily stand on the skate board and conveniently carry the handle-controlled skate board 7, the wheels 72 are designed with very small dimension. However, the front wheel 72 is directly controlled by the handle 73 to steer the handle-controlled skate board 7. The user can hardly stably control the front wheel and there is potential danger when riding.

Furthermore, when steering the handle-controlled skate board 7, in order to avoid excessively large turning angle, the user's body can hardly coordinately steer the handle-controlled skate board 7. Therefore, the existent handle-controlled skate board 7 can only run straightly and it is impossible for a user to perform figure skate with such handle-controlled skate board 7.

SUMMARY OF THE INVENTION

It is therefore a primary object of the present invention to provide a steering mechanism of handle-controlled skate board, in which at least one wheel assembly can be steered according to the tilting angle and direction of the skate board. Also, the handle-controlled skate board is able to bear greater load and a user can perform figure skate with the handle-controlled skate board.

The present invention can be best understood through the following description and accompanying drawings wherein:

DETAILED DESCRIPTION OF THE PREFERRED EMBODIMENTS

Figure 1:
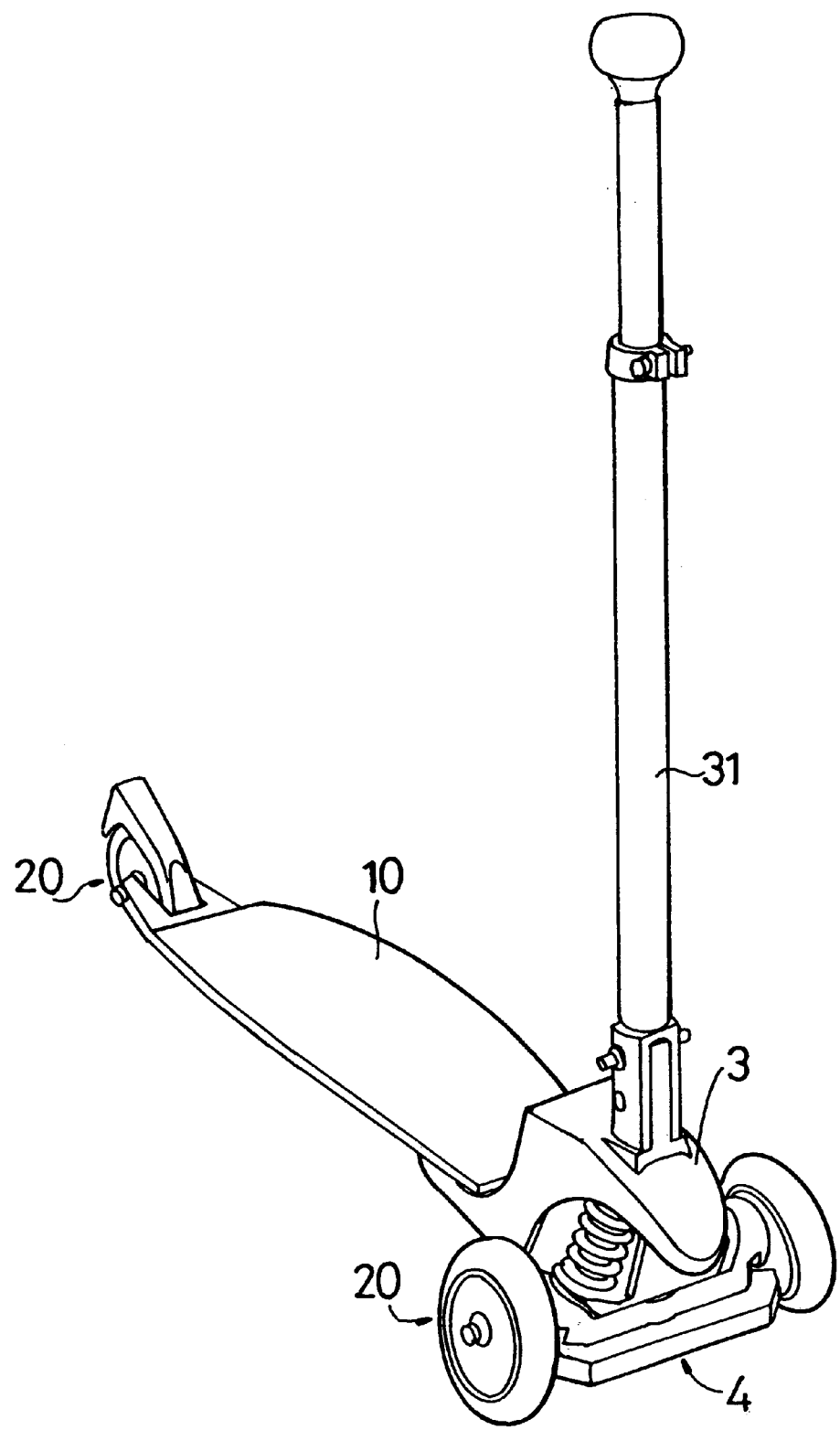
FIG. 1 is a perspective assembled view of the present invention.
Figure 2:
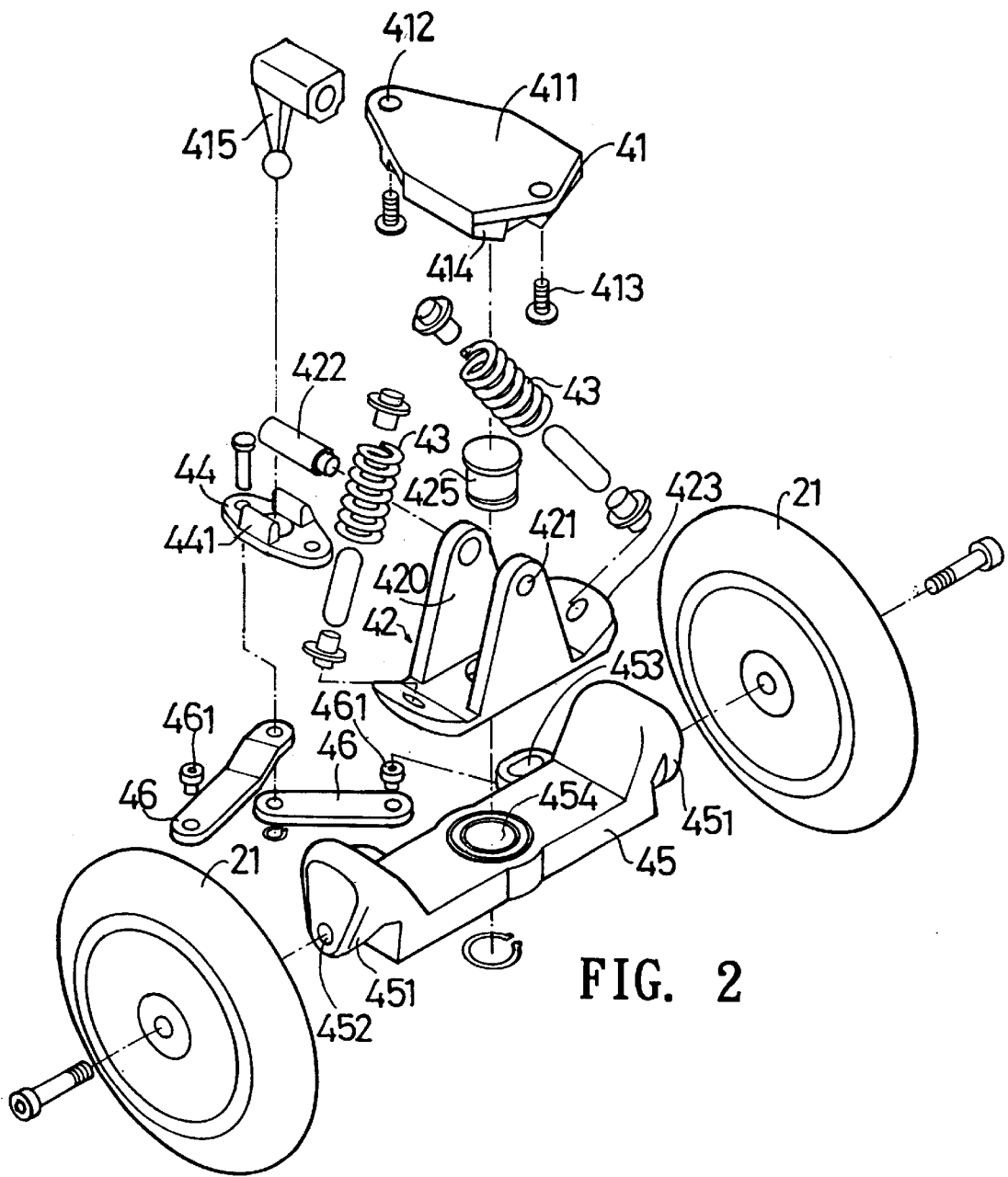
FIG. 2 is a perspective exploded view of the steering mechanism of the present invention.
Figure 3:
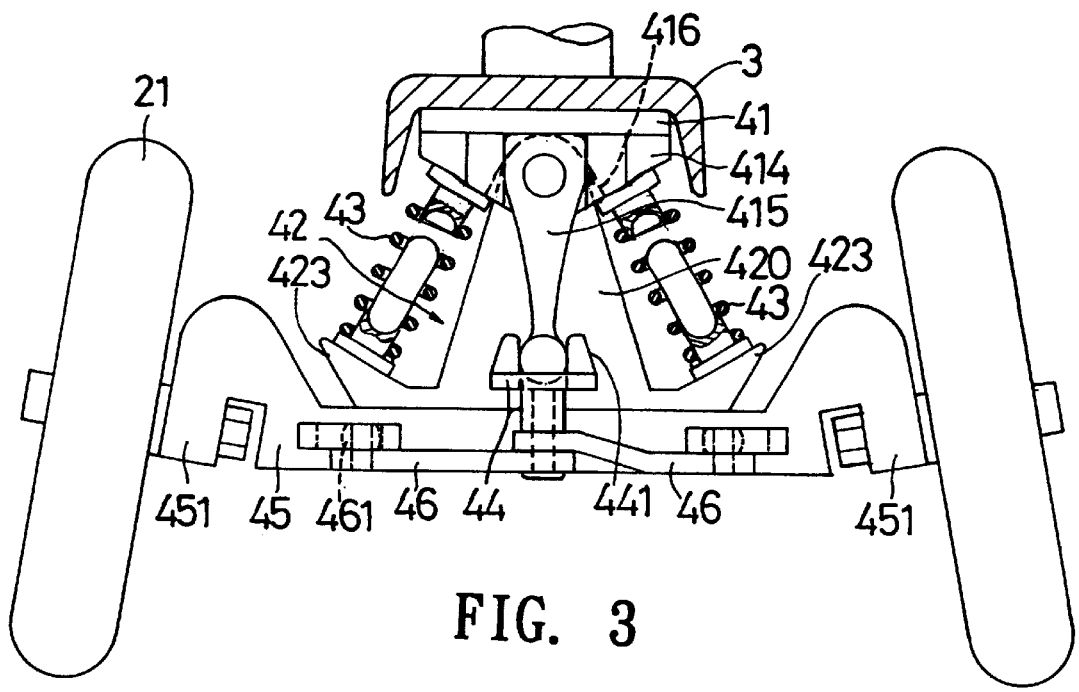
FIG. 3 is a rear assembled view of the steering mechanism of the present invention.
Figure 4:
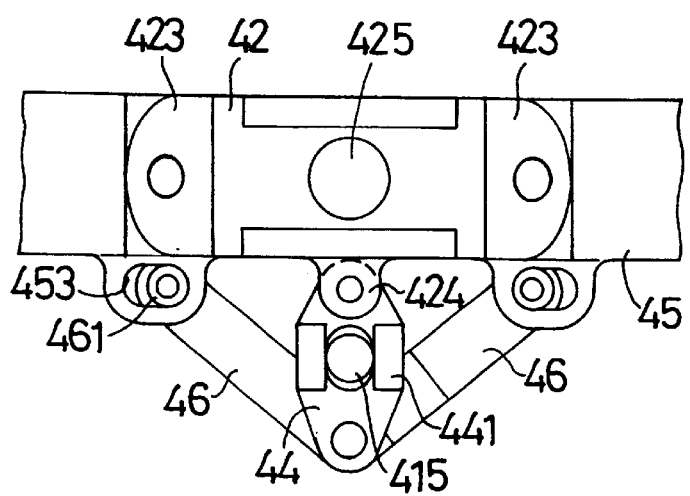
FIG. 4 is a top view of the steering mechanism of the present invention.
Figure 5:
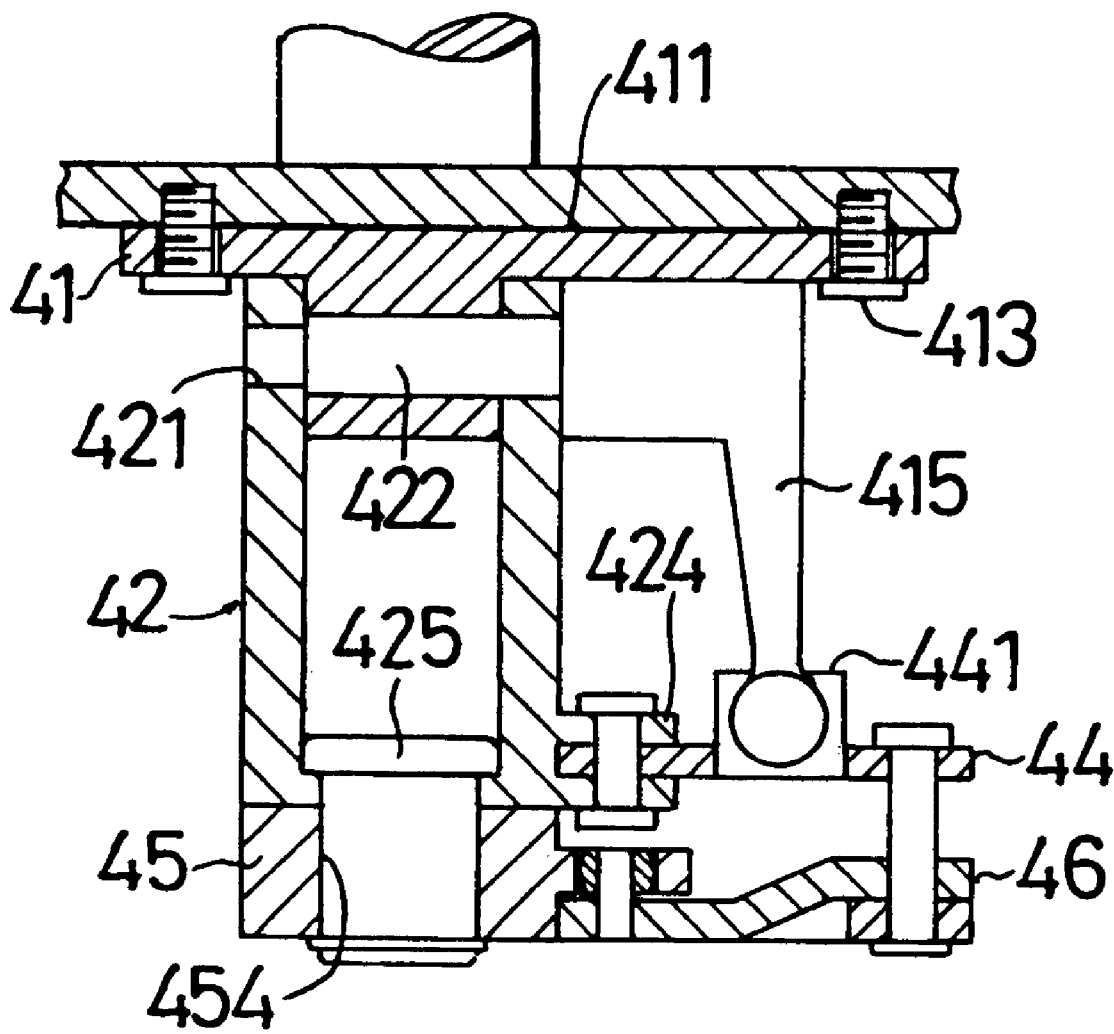
FIG. 5 is a right assembled view of the steering mechanism of the present invention.

Please refer to FIGS. 1 to 5. The handle-controlled skate board of the present invention includes a skate board 10, a casing 3 fixed at front end of the skate board, an upright stem 31 mounted on the front side of the casing 3 and a steering mechanism 4 mounted in the casing 3. A front and a rear wheel assemblies 20 are respectively mounted at front and rear ends of the skate board 10. The front wheel assembly includes two wheels 21 and controlled by the steering mechanism 4. The steering mechanism 4 includes a fixing seat 41 disposed on bottom side of the casing 3. The fixing seat 41 has a top platform 411. A front and a rear sides of the platform are formed with two bolt holes 412. Fixing bolts 413 are passed through the bolt holes 412 to lock the fixing seat 41 on the casing. A lower side of the fixing seat 41 has a projection 414 for pivotally connecting with the top of a swinging seat 42. A driving arm 415 is fixed on rear side of the projection 414. The free end of the driving arm 415 is formed with a spherical section.

The front and rear sides of the swinging seat respectively have two upright walls 420. The top sections of the upright walls are formed with shaft holes 421 spaced from the bottom of the swinging seat by a certain height. The projection 414 of the lower side of the fixing seat is clamped between the upright walls. A pivot shaft 422 is passed through the shaft holes 421 so as to pivotally connect the swinging seat 42 with the projection of the fixing seat. Two wing sections 423 laterally extend from lower edge of the swinging seat 42. The top edge of the wing section is upward inclined by a predetermined angle. Two sides of the projection 414 of the fixing seat are formed with the same inclination angle. Two compression springs 43 are compressed between the wing sections 423 and two sides of the projection 414 and inclined toward inner side.

A pivot section 424 rearward projects from lower edge of the swinging seat 42 for pivotally connecting with a front end of a rocking arm 44. The upper edge of the rocking arm 44 is disposed with a restricting seat 441 for receiving the spherical section of the driving arm 415. The center of the bottom edge of the swinging seat 42 is pivotally connected with a base bar 45 via a shaft 425 fitted in a shaft hole 454 of middle portion of the base bar 45. The base bar 45 transversely extends to outer side of the swinging seat 42. The base bar 45 has two lateral ends which slightly upward project. A lateral board 451 downward extends from each lateral end by a predetermined inclination angle. The bottom end of the lateral board 451 is slightly outward deflected and formed with a thread hole 452 at which the wheel 21 is bolted. Two sides of rear edge of the base bar 45 are formed with slots 453 for pivotally connecting with two links 46. One end of each link 46 is pivotally connected with a roller 461 inlaid in the slot 453. The other end of the link 46 is pivotally connected with a rear end of the rocking arm 44.

Figure 6:
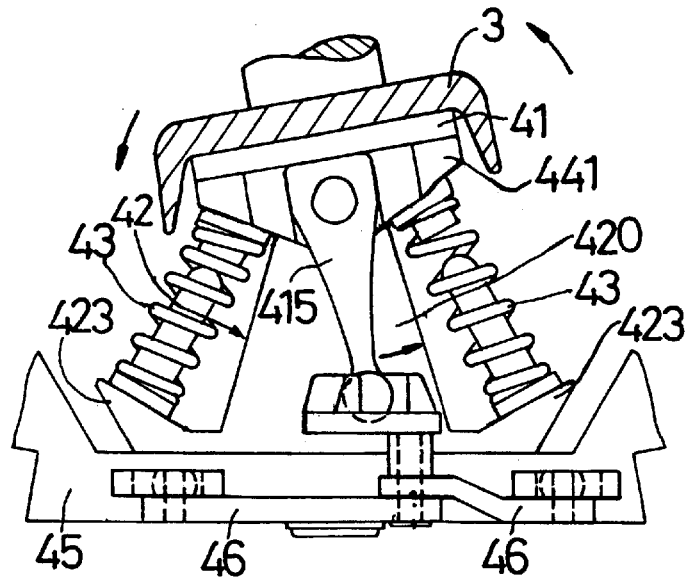
FIG. 6 is a rear view of the steering mechanism of the present invention, showing the steering operation thereof.

By means of the steering mechanism 4, a user can laterally stand on the skate board 10 with his/her hand holding the top end of the upright stem 31. The user's body is laterally tilted and the upright stem 31 is outward pushed. At this time, the skate board 10 and the casing 3 are simultaneously laterally tilted. The fixing seat 41 fixed on bottom edge of the casing 3 is pivotally connected with the top section of the swinging seat 42 so that the fixing seat 41 is driven and deflected toward one side (as shown in FIG. 6).

Figure 7:
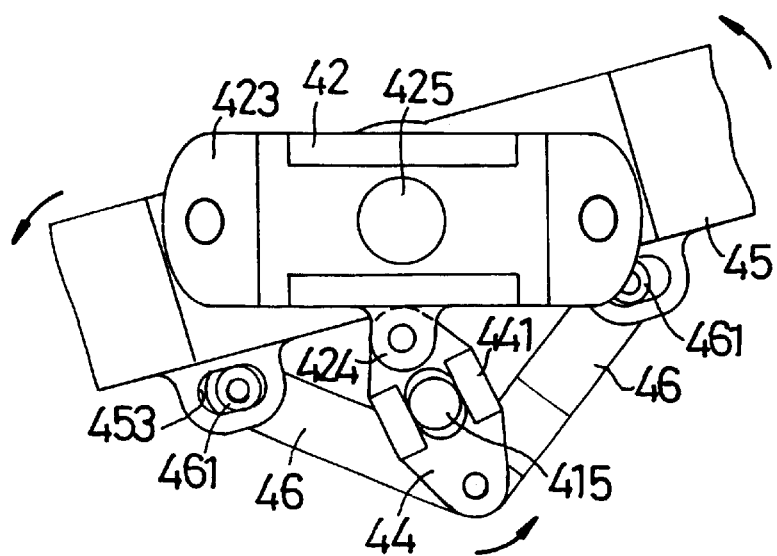
FIG. 7 is a top view, of the steering mechanism of the present invention, showing the steering operation thereof.

Accordingly, the driving arm 415 disposed on the fixing seat is swung to push the restricting seat 411 of the rocking arm. At this time, the rocking arm 44 is tilted toward the skate board and horizontally swung in reverse direction (as shown in FIG. 7). At this time, the links 46 behind two sides of the base bar 45 drive the base bar to turn.

When the fixing seat 41 is deflected on the top of the swinging seat 42, the compression springs 43 compressed between the wing sections 423 of the swinging seat and the projection 414 of the fixing seat serve to buffer the depressing force and restore the fixing seat 41 when the turning is completed. The pivot section of the fixing seat is formed with a restricting notch 416 near the upper edge of the swinging seat, whereby when the fixing seat is swung by a predetermined angle, the upper edge of the swinging seat is leant against the restricting notch 416 and cannot be further swung so as to avoid over-turning.

Figure 8:
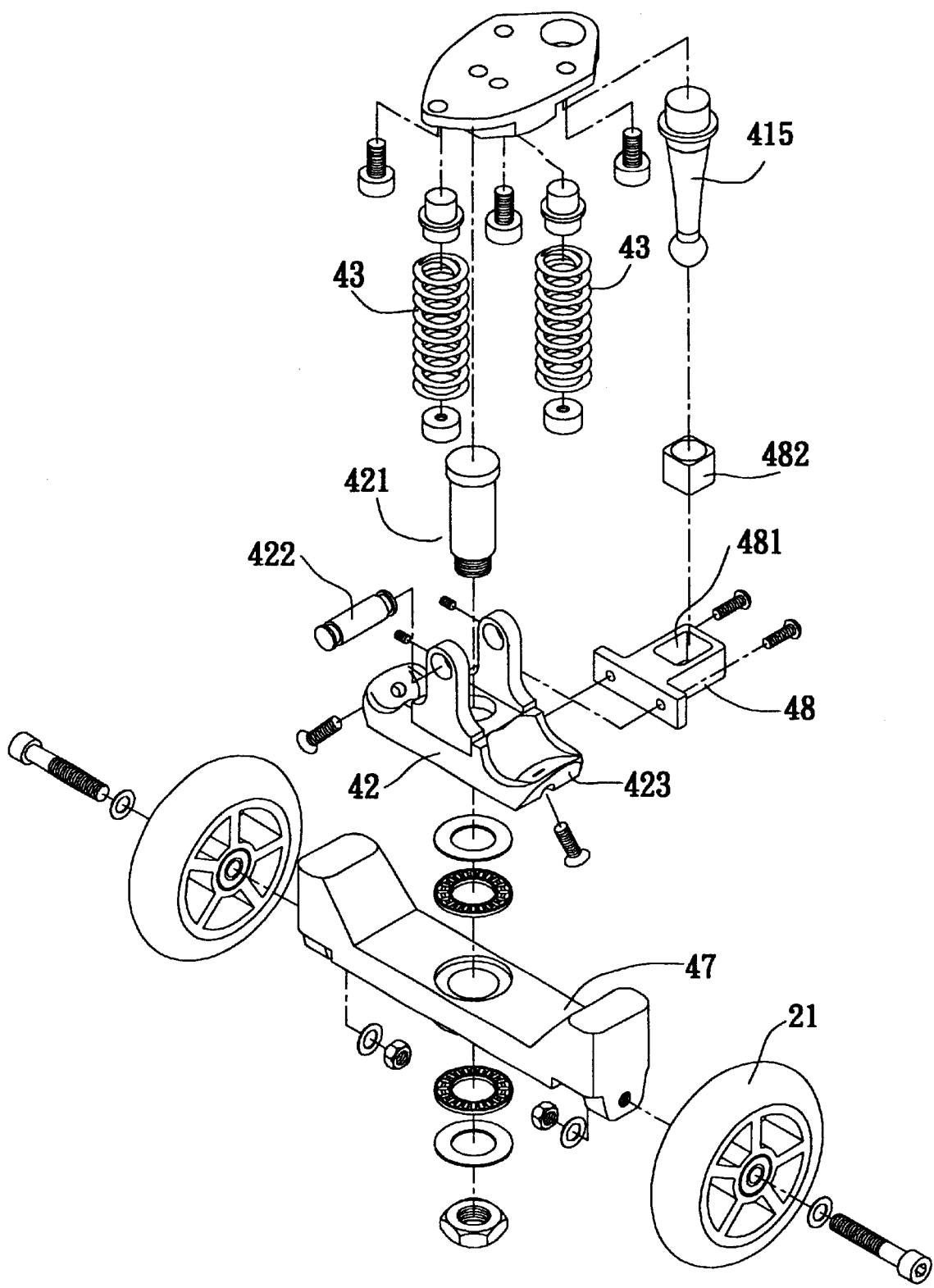
FIG. 8 is a perspective exploded view of a second embodiment of the steering mechanism of the present invention.

FIG. 8 shows another embodiment of the present invention of the steering mechanism. Similarly, the middle portion of the base bar 47 is formed with a shaft hole 474 for pivotally connecting with the center of the bottom edge of the swinging seat 42. Two lateral ends of the base bar 47 transversely extend to outer sides of the swinging seat 42 for mounting wheels 21 thereon. The greatest difference resides in that a transversely extending seat body 48 is disposed on rear side of the base bar 47. The top edge of the seat body 48 is formed with a slot 481 eccentrically positioned right behind the pivot center of the base bar 47. A slide block 482 is lengthwise slidably fitted in the slot 481. The spherical section of the free end of the driving arm 415 is inlaid in the slide block.

Figure 9:
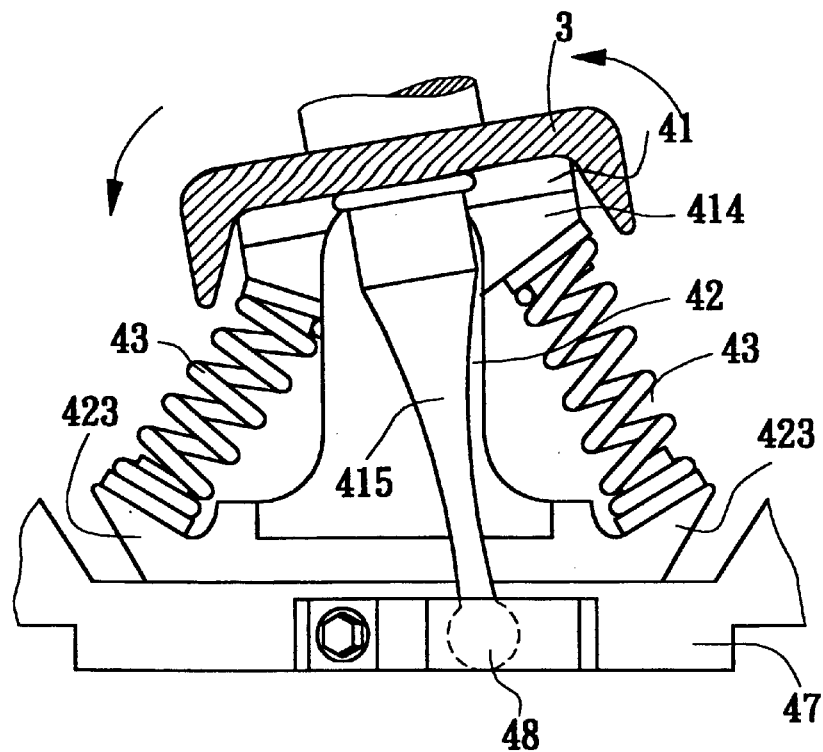
FIG. 9 is a rear view of the second embodiment of the steering mechanism of the present invention, showing the steering operation thereof.
Figure 10:
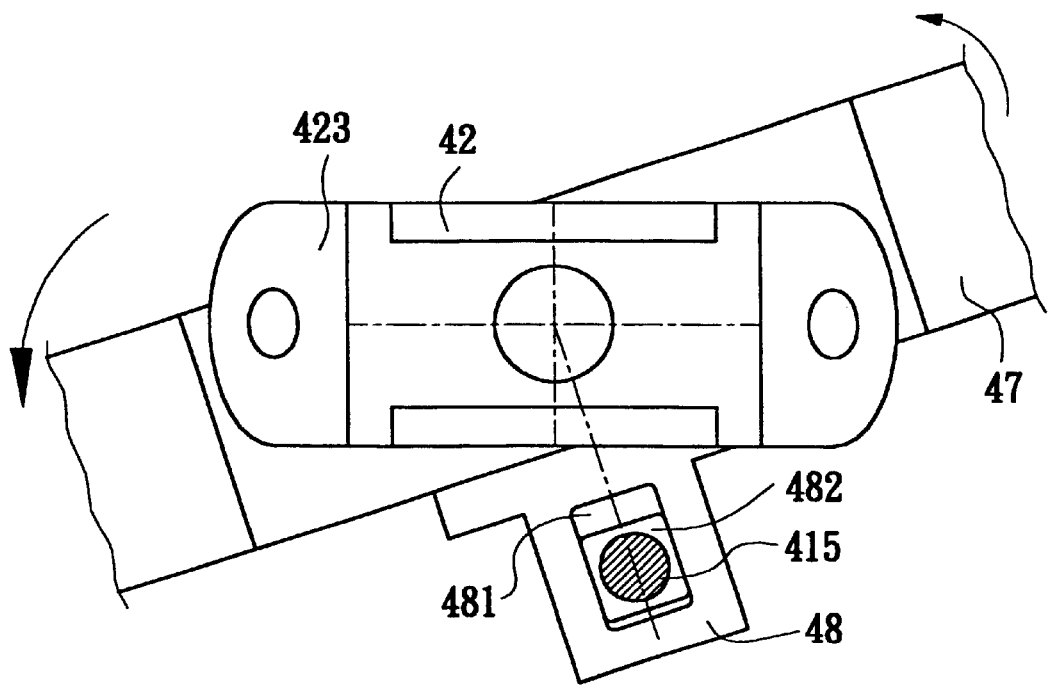
FIG. 10 is a top view of the second embodiment of the steering mechanism of the present invention, showing the steering operation thereof.
Figure 11:
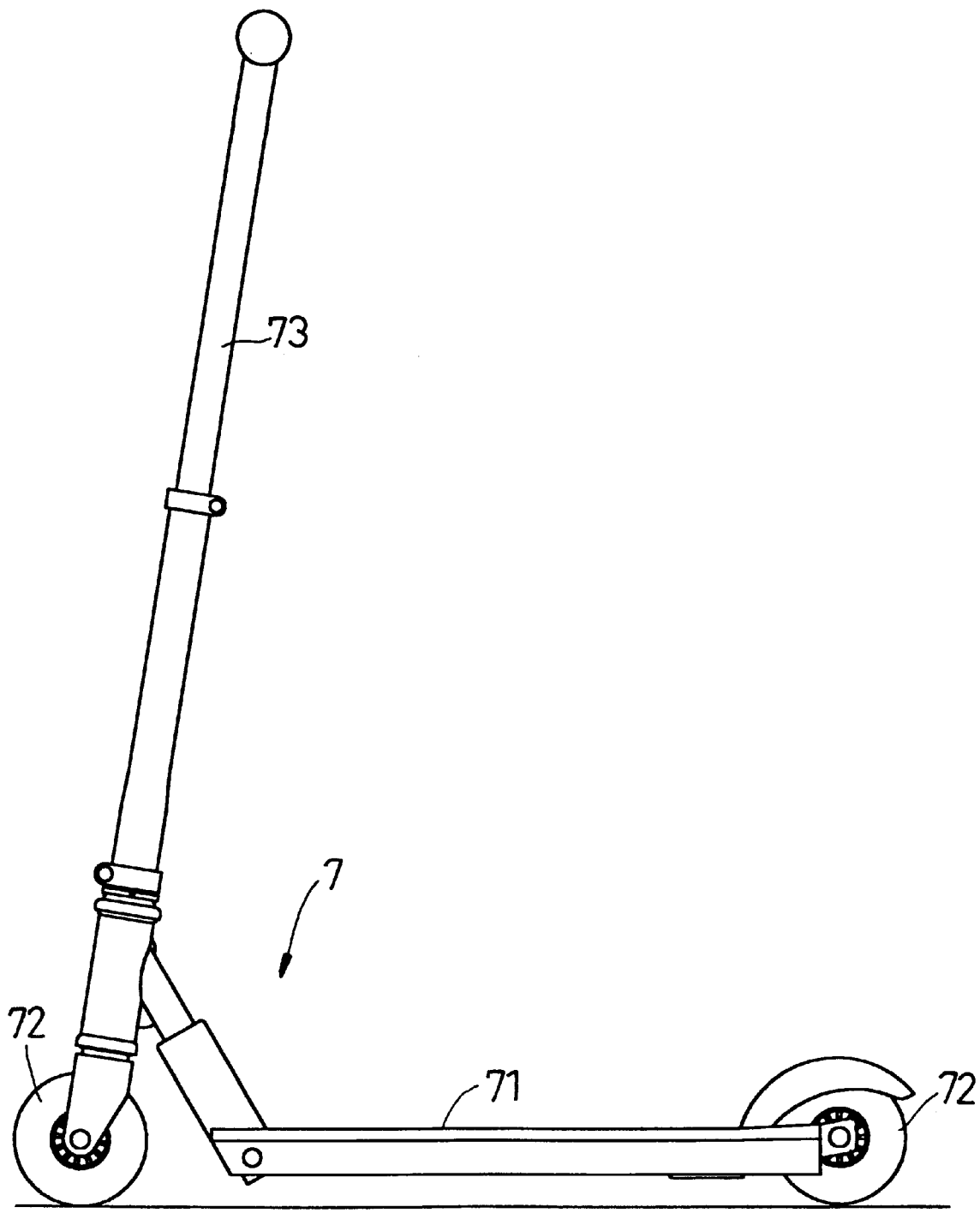
FIG. 11 is a side assembled view of a conventional handle-controlled skate board.

This embodiment is operated in the same manner as the first embodiment. Referring to FIGS. 9 and 10, by means of swinging the driving arm 415, the base bar 47 is forced to pivotally rotate about the pivot center. When the driving arm 415 is swung, the spherical section is transversely pushed and displaced by the inner side of the slot 481 of the seat body. The longitudinal displacement of the upward swinging spherical section is overcome by the slide block 482 in the slot 481. When the base bar 47 turns, the slide block 482 slides within the slot 481 to overcome the radial deflection.

In conclusion, by means of the steering mechanism, a user can steer the handle-controlled skate board by tilting the gravity center of the user's body. Therefore, the user can more coordinately operate the handle-controlled skate board and perform figure skate to have more fun. Moreover, the safety in steering can be ensured.

The above embodiments are only used to illustrate the present invention, not intended to limit the scope thereof. Many modifications of the above embodiments can be made without departing from the spirit of the present invention.

What is claimed is:

1. A steering mechanism of handle-controlled skate board comprising a skate board, a casing fixed at front end of the skate board and a front and a rear wheel assembly respectively mounted at front and rear ends of the skate board, the front wheel assembly including two wheels and being controlled by the steering mechanism, said steering mechanism being characterized in that:

the steering mechanism is fixed on front edge of the casing, the steering mechanism including a fixing seat, a swinging seat and a base bar;

the fixing seat is disposed on a bottom edge of the casing, a lower side of the fixing seat having a projection for pivotally connecting with the top of a swinging seat, a driving arm being fixed on a rear side of the projection, a free end of the driving arm being formed with a spherical section;

the swinging seat is formed with shaft holes spaced from the bottom of the swinging seat by a certain height, a pivot shaft being passed through the shaft holes so as to pivotally connect the swinging seat with the projection of the fixing seat, two wing sections laterally extending from a lower edge of the swinging seat, two compression springs being compressed between the wing sections and two sides of the projection;

a pivot section rearward projects from the lower edge of the swinging seat for pivotally connecting with a front end of a rocking arm, an upper edge of the rocking arm being disposed with a restricting seat for receiving the spherical section of the driving arm; and a center of the bottom edge of the swinging seat is pivotally connected with the middle portion of the base bar, the base bar transversely extending to outer side of the swinging seat for mounting the wheels thereon, two sides of a rear edge of the base bar being pivotally connected with two links, opposing ends of the links being pivotally connected with a rear end of the rocking arm.

2. A steering mechanism as claimed in claim 1, wherein two sides of the rear edge of the base bar are formed with slots for pivotally connecting with the two links, one end of each link being pivotally connected with a roller inlaid in the slot.

3. A steering mechanism as claimed in claim 1, wherein the front and rear sides of the swinging seat respectively have two upright walls, the top sections of the upright walls being formed with shaft holes spaced from the bottom of the swinging seat by a certain height, the projection of the lower side of the fixing seat being clamped between and pivotally connected with the upright walls, the pivot section of the fixing seat being formed with a restricting notch near the upper edge of the upright wall of the swinging seat, whereby when the fixing seat is swung by a predetermined angle, the upper edge of the swinging seat is leant against the restricting notch.

4. A steering mechanism as claimed in claim 1, wherein the base bar has two lateral ends which slightly upward project, a lateral board downwardly extending from each lateral end by a predetermined inclination angle, the bottom end of the lateral board being outwardly deflected and formed with a thread hole at which the wheel is bolted.

5. A steering mechanism as claimed in claim 1, wherein the top edge of the wing section is upwardly inclined by a predetermined angle, two sides of the projection of the fixing seat being formed with the same inclination angle, the two compression springs compressed between the wing sections and two sides of the projection being inclined toward inner side.

6. A steering mechanism as claimed in claim 1, wherein the fixing seat has a top platform formed with several bolt holes, fixing bolts being passed through the bolt holes to lock the fixing seat on the bottom edge of the casing.

7. A steering mechanism of handle-controlled skate board comprising a skate board, a casing fixed at front end of the skate board and a front and a rear wheel assemblies respectively mounted at front and rear ends of the skate board, the front wheel assembly including two wheels and being controlled by the steering mechanism, said steering mechanism being characterized in that:

the steering mechanism is fixed on a front edge of the casing, the steering mechanism including a fixing seat, a swinging seat and a base bar;

the fixing seat is disposed on a bottom edge of the casing, a lower side of the fixing seat having a projection for pivotally connecting with the top of a swinging seat, a driving arm being fixed on rear side of the projection, a free end of the driving arm being formed with a spherical section;

the swinging seat is formed with shaft holes spaced from the bottom of the swinging seat by a certain height, a pivot shaft being passed through the shaft holes so as to pivotally connect the swinging seat with the projection of the fixing seat, two wing sections laterally extending from lower edge of the swinging seat, two compression springs being compressed between the wing sections and two sides of the projection; and a middle portion of the base bar being pivotally connected with the center of the bottom edge of the swinging seat, two lateral ends of the base bar transversely extending to outer sides of the swinging seat for mounting wheels thereon, an eccentric position right behind the pivot center of the base bar being driven by the spherical section of the free end of the driving arm.

8. A steering mechanism as claimed in claim 7, wherein a transversely extending seat body is disposed on a rear side of the base bar, a top edge of the seat body being formed with a slot eccentrically positioned right behind the pivot center of the base bar, a slide block being lengthwise slidably fitted in the slot, the spherical section of the free end of the driving arm being inlaid in the slide block.

9. A steering mechanism as claimed in claim 7, wherein the top edge of the wing section is upwardly inclined by a predetermined angle, two sides of the projection of the fixing seat being formed with the same inclination angle, the two compression springs compressed between the wing sections and two sides of the projection being inclined toward an inner side.

10. A steering mechanism as claimed in claim 7, wherein the fixing seat has a top platform formed with several bolt holes, fixing bolts being passed through the bolt holes to lock the fixing seat on the bottom edge of the casing.

11. A steering mechanism as claimed in claim 7, wherein the base bar has two lateral ends which slightly upwardly project, a lateral board downwardly extending from each lateral end by a predetermined inclination angle, the bottom end of the lateral board being slightly outwardly deflected and formed with a thread hole at which the wheel is bolted.

12. A steering mechanism as claimed in claim 7, wherein the front and rear sides of the swinging seat respectively have two upright walls, the top sections of the upright walls being formed with shaft holes spaced from the bottom of the swinging seat by a predetermined height, the projection of the lower side of the fixing seat being clamped between and pivotally connected with the upright walls.

* * * * *